United States Patent Office 3,518,192
Patented June 30, 1970

3,518,192
OLEOPHILIC GRAPHITE
Roger John Russell Cairns, Addlestone, Surrey, and Stanley Charles Dodson, Leatherhead, Surrey, England, assignors to The British Petroleum Company Limited, London, England
No Drawing. Filed Feb. 20, 1969, Ser. No. 801,198
Claims priority, application Great Britain, Feb. 29, 1968, 9,818/68
Int. Cl. C10m 5/02
U.S. Cl. 252—29                3 Claims

ABSTRACT OF THE DISCLOSURE

Oleophilic graphite produced by grinding graphite in water containing oil-soluble surface active agent e.g. n-butylamine.

---

This invention relates to graphite, more particularly it relates to an oleophilic graphite.

Oleophilic graphite has a heat of adsorption of n-dotriacontane from n-heptane of at least 700 millicalories per gram and a heat of adsorption of n-butanol from n-heptane of less than 200 millicalories per gram.

Oleophilic graphite possesses the property of thickening lubricating base oils into greases and also possesses lubricating load-carrying properties.

Graphite ground in water is not oleophilic in nature. This is thought to be due to the high surface tension and the polar nature of water. In graphite ground in water the graphite particles have a chunky shape whereas in oleophilic graphite the particles are plate-like. The differences in shape indicate that, in graphite ground in water, the graphite crystals have been cleaved in two planes, and large planar crystals of graphite are not formed. Such graphite powders are unable to thicken lubricating oils into greases.

We have now found, surprisingly, that a graphite having grease thickening properties can be produced by grinding graphite in water in the presence of various additives.

According to the invention there is provided a method of preparing a graphite having a heat of adsorption of n-dotriacontane from n-heptane of at least 500 millicalories per gram which comprises grinding graphite in a grinding fluid which comprises water and a water soluble additive which contains a long chain hydrocarbon group.

By long chain hydrocarbon group is meant a hydrocarbon group containing at least six and preferably at least ten carbon atoms.

The invention also provides lubricating compositions which comprise a mineral or synthetic base oil containing graphite particles produced by grinding graphite in water in the presence of a water soluble additive which contains a long chain hydrocarbon group as herein defined.

Suitable water soluble compounds which can be used as additives include quaternary ammonium compounds having at least one $C_6$ or higher alkyl group attached to the nitrogen atom. The anionic part of the quaternary ammonium compound can be any suitable acid radical such as chloride, orthophosphate or sulphate. Other water soluble compounds are long chain fatty acids and esters, and long chain alkyl substituted sulphonates.

Preferably up to 10% by weight of the aqueous grinding fluid consists of the water soluble additive, and more preferably from 2-7% by weight.

Both natural and synthetic graphite are well-known and readily available. The synthetic material is, for example, produced from petroleum coke by heating to from 1000° C. to 3000° C. in a vacuum or inert gas. Typically it contains from 95 to 100% weight carbon. The natural material may have a slightly lower carbon content than this and usually has a larger crystal size.

Preferably the amount of graphite in the mixture of aqueous grinding fluid and graphite should not exceed 50% by weight and more preferably should be from 2 to 20% by weight.

The water used in the present invention should be pure and preferably should have as much of the dissolved gases, especially oxygen removed as possible.

If desired the water soluble grinding additive can be dissolved in an organic water soluble solvent before it is added to the water, optionally an oil can also be added. Suitably solvents include alcohols such as isopropanol.

Preferably air is substantially excluded from the grinding process and more preferably the graphite is below the surface of the grinding fluid throughout the grinding process.

The grinding may be carried out in any suitable grinding mill or device and it is desirable to continue the grinding until an oleophilic graphite having a surface area (as determined by nitrogen adsorption) of at least 20 and preferably at least 30 square metres per gram is obtained.

One of the quickest and most effective techniques is to carry out the grinding in a vibratory ball mill.

It is desirable to exclude air so far as possible during the grinding operation. When a continuous grinding method is used the circuit is partly filled with the grinding liquid, the ball mill is filled with the balls and graphite and the rest of the circuit filled with the grinding fluid.

A magnetic filter can be used to remove small steel particles from the slurry. A circulatory system can also be used wherein the slurry is pumped through an external magnetic filter and then returned to the mill.

A suitable vibratory ball mill is sold under the trade name "Megapact," manufactured by Pilamec Limited. The grinding effect is produced by the impact of the balls upon the graphite and upon each other.

The slurry of oleophilic graphite can be separated from the balls by sieving.

In order to prevent the water corroding the balls or grinding chamber an anti-corrosion additive can be added to the water. A suitable anti-corrosion additive is sodium nitrite. In some cases the water soluble additive can also function as an anti-corrosion additive.

Preferably the vibratory ball mill has a vibration frequency of at least 1500 vibrations per minute and an amplitude of vibration of at least 2 mm.

Lubricating compositions according to the present invention can be prepared by dispersing the oleophilic graphite in a mineral or synthetic base oil. When it is desired to obtain a grease sufficient graphite is added to the base oil to thicken the oil to the required consistency. Generally the grease composition will contain from 10–50% by weight of graphite and preferably it will contain from 10–25% by weight of graphite.

The lubricating base oil may be a mineral oil or a synthetic oil.

Suitable mineral oils are refined mineral oils obtained from petroleum, for example, those having a viscosity at 210° F. within the range from 2 to 50 centistokes preferably from 4 to 40 centistokes.

Synthetic lubricating oils include organic esters, polyglycol ethers, polyphenyl ethers, fluorinated hydrocarbons, silicate esters, silicon oils and mixtures thereof.

The most important class of synthetic oils are the organic liquid polyesters, particularly the neutral polyesters, having a viscosity at 210° F. within the range from 1 to 30 centistokes. The expression "polyester" is used to mean esters having at least two ester linkages per molecule. The expression "neutral" is used to mean a fully esterified product. Examples of suitable polyesters include liquid diesters of aliphatic dicarboxylic acids and monohydric alcohols, as such, for example, dioctyl sebacate, dinonyl sebacate, octyl nonyl sebacate, and the corresponding azelates and adipates; liquid diesters of aliphatic dicarboxylic acids and phenols and more complex polyesters.

The graphite can be incorporated into a grease by a number of methods. It is preferred to incorporate the oleophilic graphite into a grease, immediately after grinding. However, if the oleophilic graphite is prepared some time before incorporation into the grease, it is preferred to store the oleophilic graphite in the liquid in which it is ground.

The graphite of the present invention is preferably separated from the aqueous grinding fluid by sieving, and dispersed in the base oil by stirring. The base oil may be warmed to facilitate dispersion and the dispersion may be colloid milled to produce a more homogeneous dispersion.

Preferably the graphite is washed with a liquid miscible in water and oil e.g. an alcohol such as isopropanol, before dispersion in the oil.

The greases according to the invention have remarkably high drop points. When their drop points are measured according to the IP or ASTM standard methods, they are found to be above 400° F: such greases are described as "infusible" and are difficult to produce by conventional methods. By using carefully selected base oils, for example, synthetic oils with high oxidation and thermal stability, greases having a unique combination of properties can be produced.

For use at temperatures above 140° C. antioxidants can be added to the greases according to the invention. In certain circumstances it may be advantageous to add dispersants to the graphite either before grinding or after grinding to oleophilic graphite. In this way the dispersion of the oleophilic graphite may be aided. Viscosity index improvers, metal deactivators, anti-corrosion agents etc. can also be added to the greases. Load-carrying additives can also be added to the greases according to the invention.

The invention will now be described with reference to an example.

EXAMPLE

To 450 gms of degassed water was added 8.1 gms. of a 50% solution of a quaternary ammonium compound in an isopropanol/water mixture, to give a total weight of 4 gms. of the quaternary ammonium compound. The quaternary ammonium compound was $$nC_{16}(CH_3)_3N^+Cl^-$$

sold under the trade name "Arquad 16/50."

100 gms. of graphite was added and the mixture was circulated through a megapact vibrator ball mill made by Pilamec Limited. The vibration frequency was 3,000 vibrations per minute (50 cycles per sec.) and the vibration amplitude was 4 mm. The mixture was ground for eight hours.

After grinding the mixture was separated from the balls in the ball mill, sieved, and the graphite powder washed with iso-propanol.

The procedure was repeated using twice as much "Arquad 16/50."

The washed graphite was dispersed in BG 160/95 grade refined lubricating oil obtained from a Middle East crude petroleum to form a grease. The grade reference signifies a viscosity of 160 seconds Redwood 1 (38.9 centistokes) at 140° F. and a viscosity index of 95.

The results are shown in Table 1.

TABLE 1

| Grinding additive | Surface area, metres² per grm. BET | Heat of adsorption, $nC_{32}$ | Ref. No. of graphite produced |
|---|---|---|---|
| 4 gms. Arquad 16/50 | 34 | 700 | 1 |
| 8 gms. Arquad 16/50 | 30 | 862 | 2 |
| NaNO₂ [1] | 32 | 460 | |

[1] For comparison.

The heats of adsorption were measured using a flow microcalorimeter as described in Chemistry and Industry, Mar. 20, 1965, pages 482–489.

The data on greases formed is shown in Table 2.

TABLE 2

| Graphite | Wt. based on wt. of grease, percent | Penetrations ¼ scale | | Bleed, percent |
|---|---|---|---|---|
| | | Unworked | Worked 60 strokes | |
| 1 | 25 | 82 | 84 | |
| 2 | 25 | 67 | 74 | 6.2 |
| 2 | 20 | 83 | 90 | 12.2 |

The drop points of all the greases were above 260° C.

What we claim is:

1. A method of preparing oleophilic graphite which comprises forming a mixture which consists of less than 50% by weight of graphite in water which contains an effective amount of a water-soluble organic compound which contains a long chain hydrocarbon group containing at least 6 carbon atoms, grinding said mixture until the graphite becomes oleophilic and has a surface area of from 20 to 800 square meters per gram, separating said aqueous solution from the oleophilic graphite.

2. An oleophilic graphite produced by the method of claim 1.

3. A lubricating composition consisting of lubricating oil containing an effective amount of an oleophilic graphite produced by the method of claim 1.

References Cited

UNITED STATES PATENTS 3,384,584   5/1968   Groszek _____ 252—25

DANIEL E. WYMAN, Primary Examiner

I. VAUGHN, Assistant Examiner

U.S. Cl. X.R.

23—209.1, 209.2